United States Patent [19]
Authier

[11] Patent Number: 5,793,164
[45] Date of Patent: Aug. 11, 1998

[54] LOW INTENSITY AIRCRAFT ROTOR TIP ILLUMINATION

[76] Inventor: Ricky J. Authier, 5009 Pacific Hyw. East Suite 12, Fife, Wash. 98424

[21] Appl. No.: 714,847

[22] Filed: Sep. 17, 1996

[51] Int. Cl.⁶ .................................................. G05F 1/00
[52] U.S. Cl. .................. 315/300; 315/302; 315/178; 362/34; 362/62; 362/192; 340/946; 340/980
[58] Field of Search .................................. 315/300, 302, 315/296, 178, 77; 362/34, 62, 191, 192, 800; 340/946, 979, 980, 982

[56] References Cited

U.S. PATENT DOCUMENTS

| | | | |
|---|---|---|---|
| 2,423,528 | 7/1947 | Stewart | 177/329 |
| 3,174,552 | 3/1965 | Soucy, Jr. | 170/159 |
| 3,395,875 | 8/1968 | Donovan | 244/17.11 |
| 3,710,311 | 1/1973 | Avital | 340/27 |
| 3,723,722 | 3/1973 | Van Iderstine et al. | 240/7.7 |
| 3,846,023 | 11/1974 | Wilkin | 356/21 |
| 4,580,196 | 4/1986 | Task | 362/62 |
| 4,737,788 | 4/1988 | Kennedy | 342/29 |
| 4,779,942 | 10/1988 | Verney | 350/1.1 |
| 4,916,581 | 4/1990 | Authier | 362/34 |
| 5,049,869 | 9/1991 | Harris | 315/296 X |
| 5,086,378 | 2/1992 | Prince | 362/103 |
| 5,381,312 | 1/1995 | Authier | 362/62 |
| 5,416,672 | 5/1995 | Authier | 362/62 |

*Primary Examiner*—Robert Pascal
*Assistant Examiner*—Haissa Philogene
*Attorney, Agent, or Firm*—Glenn D. Bellamy

[57] ABSTRACT

A wing tip system for rotor craft includes a downwardly-facing light housing to provide a visual aid to rotor wingtip position. This system is visible to crew members and to adjacent crew, particularly when using night vision goggles (NVG) or other ambient night vision (ANVIS) equipment. This allows tip lighting to be provided in situations where covert helicopter operations are desired. The lighting further is compatible with ANVIS equipment, in that it permits operation noncandescent light in order to prevent blooming or other effects which would otherwise diminish the effectiveness of the ANVIS equipment. The lighting system further has a higher level of illumination, in which rotor tip lighting is increased to become more visible without the use of ANVIS equipment.

19 Claims, 6 Drawing Sheets

LOW INTENSITY AIRCRAFT ROTOR TIP ILLUMINATION

TECHNICAL FIELD

This invention relates to aircraft position lights and, more particularly, to low-intensity, anti-collision or collision avoidance lights that are mounted directly to aircraft and/or helicopters for indicating position of the aircraft during tactical, covert, night flying operations.

BACKGROUND OF THE INVENTION

Tactical, covert, nighttime combat and training flying missions are routinely conducted by military forces. In these operations, aircraft, particularly helicopters, fly in close formation along the contour of the landscape in order to avoid enemy radar, as well as to avoid early visual detection. Such operations are known as "ground skimming" or "nap-of-the-earth" flights.

It is extremely difficult for pilots to see other aircraft flying in formation during covert, night flying missions. Typically, these missions are conducted either at night or at dawn or dusk where natural lighting is at a minimum. In addition, since the purpose of such missions is to avoid detection, the aircraft fly with their navigation lights turned off. Further, the aircraft are usually painted with highly light absorbent paint to make it even more difficult to see the aircraft at night. As a result, the risk of aircraft collisions is greatly increased.

To enhance the ability of pilots to see other aircraft in low level light conditions, night vision goggles (NVGs), originally used by the army and infantry, were developed for military aviation. Generally, these goggles use tiny sensors to amplify electronically ambient light up to 100,000 times. Green images of night landscapes are displayed on two tiny video screens embedded in binocular-like goggles suspended from a pilot's helmet. Sophisticated infrared NVGs can provide images not only at night, but also in inclement weather.

Due to the limitations in technology of NVGs, such goggles have not eliminated the risk of aircraft collisions. For example, military pilots mistakenly attempting to land on other aircraft is a common type of accident. *Army Times* reported in its Mar. 6, 1989 issue that between 1978 and 1989, 50 U.S. Army aircraft were involved in accidents where NVG goggles were worn. These accidents cost the Army more than $114.6 million in lost aircraft and injuries. To this date, aircraft collisions are a constant concern for the military during such covert nighttime operations. Many problems associated with NVGs are due to the single color lighting, limited field of view, and depth perception limitations of the goggles. Such problems can be reduced by illumination of the blade tips of rotor tips of rotor craft.

My earlier U.S. Pat. No. 4,916,581 discloses a device for illuminating the ends of a helicopter rotor blade by attachment of a chemiluminescent light stick to the rotor blade's tip. The chemiluminescent light provides an indication to the pilot of the helicopter of the position of the rotor blade's outer perimeter. The system works well, but has two drawbacks. First, the system must be loaded prior to each use. Second, it is not possible to selectively turn the device on and off in flight.

On military helicopters, it is sometimes desirable to operate without providing illumination on aircraft. While helicopters tend to give away their presence through the sound produced by the rotors, navigation lighting can provide an enemy with information regarding the precise position of the aircraft. For this reason, it is desirable to be able to switch off exterior lighting and to control the intensity of exterior lighting.

Close formation flying operations require that pilots know the position of other aircraft and the direction or heading of the aircraft, which information allows pilots to track closely behind other aircraft in formation. With this information, pilots can swiftly and efficiently perform nap-of-the-earth flying missions. While standard navigation lighting for helicopters provide information regarding the heading of the aircraft, close formation flying requires that the pilot have an awareness of the arc of the main rotor blades of that aircraft as well as of other aircraft in a formation.

Hardwired, electric noncandescent position light systems have been developed. While costly, such systems provide an ability to illuminate rotor tips. These systems were designed to be seen by other aircraft and ground personnel, but not by the pilot. These devices have the ability to emit noncandescent light. Noncandescent light is light in the non-visible spectrum, such as infrared or ultraviolet light.

Another consideration when using NVGs is that illumination which is sufficient for ordinary vision will normally be too intense for use with night vision goggles. If the lighting is intense enough, an effect known as "blooming" will result in the NVG or a portion of the NVG being unusable for a period of time.

The problem of adversely affecting night vision goggles is exaggerated in the case of the helicopter tip lights because of the physical movement of the helicopter blade. Since the blade is moving about a horizontal arc the blooming caused by rotor tip lighting can easily overwhelm large portions of the NVGs or other ambient night vision (ANVIS) equipment. This blooming effect affects other light amplification equipment, such as forward looking infrared (FLIR) equipment, and infrared sensors, such as missile tracking systems.

Light which projects toward light sensing equipment affects the equipment's light sensing. Unless measures are taken to prevent focusing other light amplification equipment, such as FLIR equipment, stray light from nearby light sources can interfere with the operation of the light amplification equipment, and overwhelms the light sensing capability of the light amplification equipment. Therefore, light focused helicopter tip lighting which is visible from the cockpit causes the light amplification equipment to be diminished in effectiveness. For this reason, it is desired that any lighting be sufficiently suppressed to permit normal operation of ANVIS equipment and infrared sensing equipment despite the existence of such lighting.

The installation of a hardwired, switchable electric noncandescent rotor tip lighting system is costly. For this reason, if an aircraft has an existing tip lighting system suitable for non-covert navigation, it is uneconomical to provide a complete second system which is more suitable for covert operation and NVG equipment.

The Army has attempted to use a tape-over system for covert, nighttime, training missions. The navigational lights, which are the red, green, and white lights on the aircraft, are taped over with a translucent tape so that a low intensity light is given off. While such a system works satisfactorily in providing a low intensity light, it is not entirely practical to use and sometimes is used in contravention of FAA and other civilian regulations regarding aircraft lighting. When aircraft are required to fly through civilian airspace prior to or during training missions, it is therefore undesirable to use the tape-over method. Therefore, the aircraft must land when flying into civilian air space so that the tape can be removed and when flying out of civilian air space into military airspace so that the tape can be added. This delays the training mission and sometimes is not practical for lack of a suitable landing site.

Accordingly, a heretofore unaddressed need exists for a practical and cost effective, low intensity anti-collision aircraft illumination system for covert night flying operations.

DISCLOSURE OF THE INVENTION

In accordance with the present invention, an aircraft position light is provided with multiple lighting levels and is cockpit visible during conditions of normal and covert night flight. A rotor tip lighting system is provided with an extension which is visible below a plane of the rotor blade so that it can be seen from the cockpit of the aircraft. At a low intensity level, the light is noncandescent or low candescent, meaning that it is either non-visible or has a low intensity of visible light, referred to as candescent light. The intensity of the light at the first level is sufficient for illumination of the rotor tips so that a person with NVG ("night vision goggles") equipment can see the lights, but the NVG equipment is otherwise not disturbed by the lighting. The intensity, as seen from an adjacent aircraft, is such that the rotor tips are visible when using NVG equipment, provided that the viewer is close enough to the illuminated aircraft that rotor tip position is an issue.

At higher levels of illumination, candescent lighting is provided which is compatible with NVG equipment, but which allows the pilot of the aircraft and the pilots of neighboring aircraft to easily maintain visual separation either with or without NVG equipment.

In accordance with a further embodiment of the invention, illumination of the rotor tip is provided by a position light which is visible only along a predetermined range of angles. Inside tip position is limited to a preferred range of angles which provide for visibility from the aircraft, while outside tip lighting is limited in viewing angle to positions which are compatible with the relative positions of aircraft flying in formation.

In accordance with a further aspect of the invention, a position marker system for a rotor craft consists of a position marker light mounted on at least one rotor wing tip and is supplied power which can be controlled to modify the nature of the light output. In one output configuration, both visible position marker lights and NVG compatible lights are displayed. In another output configuration, visible position lighting is reduced or eliminated, but NVG compatible lighting is displayed. The NVG compatible lighting is visible from within the cockpit, and in the preferred embodiment, is also visible through night vision goggles at close range from an aircraft flying in formation at the "wingman's" position.

According to a preferred embodiment, the lighting system includes a wing tip lighting fixture, with a top or side lighting position, and a lower lighting position. The top or edge lighting position includes lights which are visible without the requirement for night vision devices such as NVG equipment. These comprise a primary wing tip lighting system and a suppressed light output lighting system. The lower lighting position includes lights which are part of the suppressed output lighting system. Light from the suppressed output lighting system is filtered so as to have a substantial noncandescent component and transmit light at levels which are compatible with NVG equipment. To an extent that candescent light is transmitted, the candescent light is at a reduced level, so that the wing tip may be visible from within the cockpit, but the lighting is difficult to detect from a distance. This lower lighting position is considered to be a secondary lighting system. The secondary lighting system includes a component which is visible from a formation aircraft flying at the "wingman's" position. In the preferred embodiment, this component of the secondary lighting system is at the lower lighting position, although it is also possible to provide such lighting at the upper position, as well, since both positions are within the line of sight of a wingman.

The primary lighting system may also include a component which is mounted in the lower lighting position in order to provide cockpit visibility of the primary lighting system. This permits the primary lighting system to be used to provide a visual reference to the crew of rotor tip location. The cockpit-visible primary lighting is preferably filtered so as to reduce interference with ANVIS and infrared sensing equipment.

In one embodiment of the invention, power to the primary lighting system and the suppressed output lighting system are provided from a control module through a single conductor and (separate) ground. A switching module in each rotor controls the current to the primary lighting system and the suppressed output lighting system. In the preferred configuration, the switching module in each rotor is responsive potential levels on the conductor, and the switching module controls power to the lighting systems according to these potential levels. When potential is below a predetermined level (voltage), the switching module directs current solely to the infrared emitters. When potential is above the predetermined level, the switching module directs current to lamps in the primary lighting system.

In a simplified variation of the above embodiment, a resistor in series with lamps in the primary lighting system controls light output of the primary lighting system. When current from the control rheostat is below a predetermined level, the EMF (voltage) at the primary and secondary lighting systems drops. As a result, EMF across the primary lighting system drops below a level sufficient for illumination. The secondary lighting system, which is not series connected through a resistor, remains illuminated. The primary lighting system therefore has a reduced current flow as the result of the resistor which is placed in series with the primary lighting system, and the primary lighting system remains unilluminated. When power supplied to the lighting systems from the rheostat is increased, resistance across the secondary lighting system increases, and the primary lighting system illuminates, with current being supplied through the resistor.

In an alternate embodiment, the primary lighting system is in series with a rectifier, so that current which is forward biased in accordance with the rectifier illuminates the primary lighting, while current which is reversed biased against the rectifier is limited to the secondary lighting. In the alternate embodiment, in a forward biased condition, both visible position marker lights and NVG compatible lights are displayed. In a reversed bias condition, current is interrupted to the visible position lighting, but NVG compatible lighting is displayed. The NVG compatible lighting is visible from within the cockpit, and in the preferred embodiment, is also visible through night vision goggles at close range from an aircraft flying in formation at the "wingman's" position.

In accordance with a further embodiment of the invention, a wing tip lighting system for a rotor craft is provided in which mounted is augmented with a second light in order to provide visibility beyond a range of vision of the first light. The second lighting position extends downward from the wing tip and, in the preferred embodiment, is located outboard of the wing tip so that it is not necessary to modify the wing tip in order to accommodate the secondary light.

BRIEF DESCRIPTION OF THE DRAWINGS

Like reference numerals are used to indicate like parts throughout the various figures of the drawings, wherein.

BEST MODE FOR CARRYING OUT THE INVENTION

Figure 1:
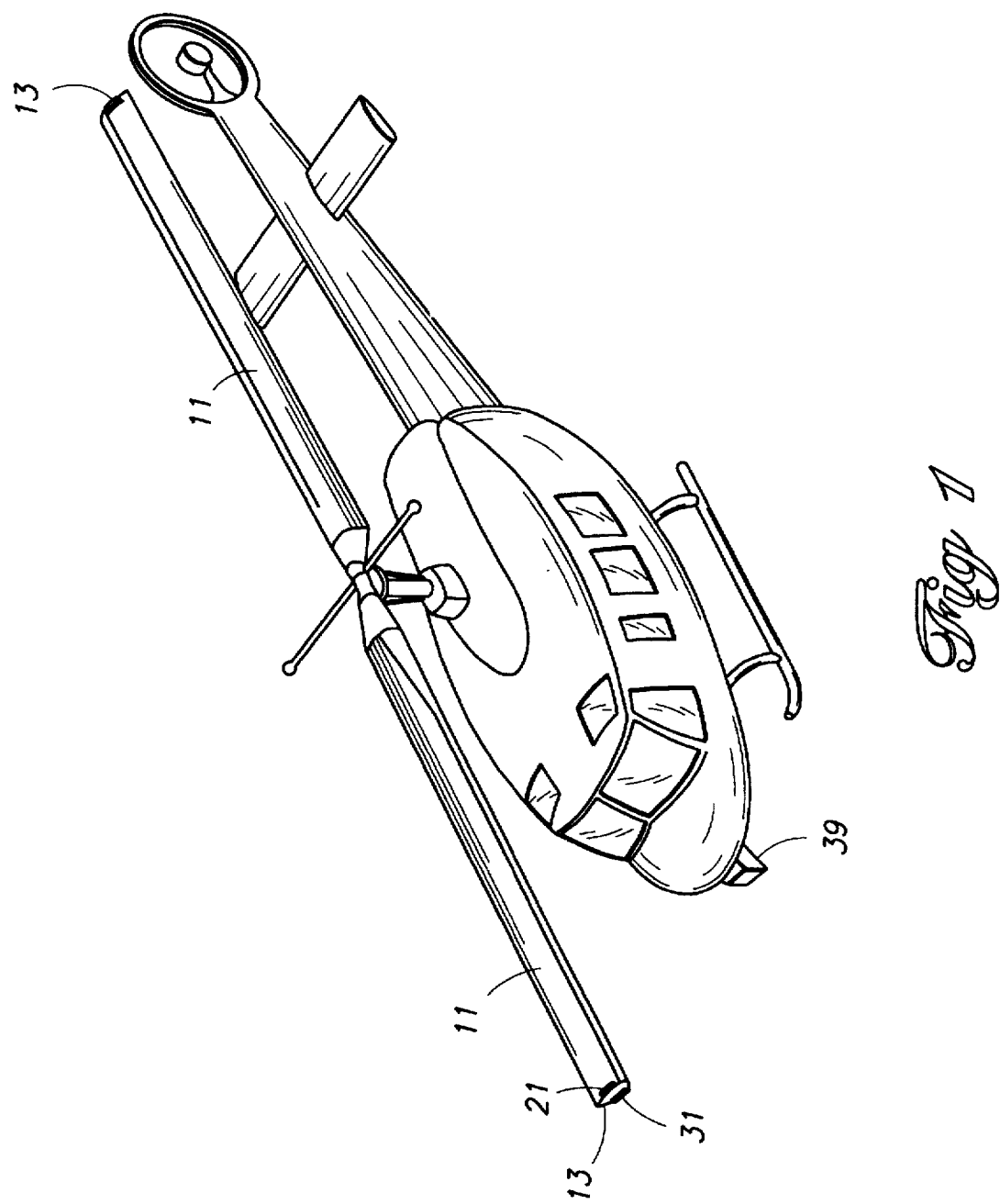
FIG. 1 is a configuration of a helicopter, showing the relative position of the cockpit to the rotor tips.
Figure 2:
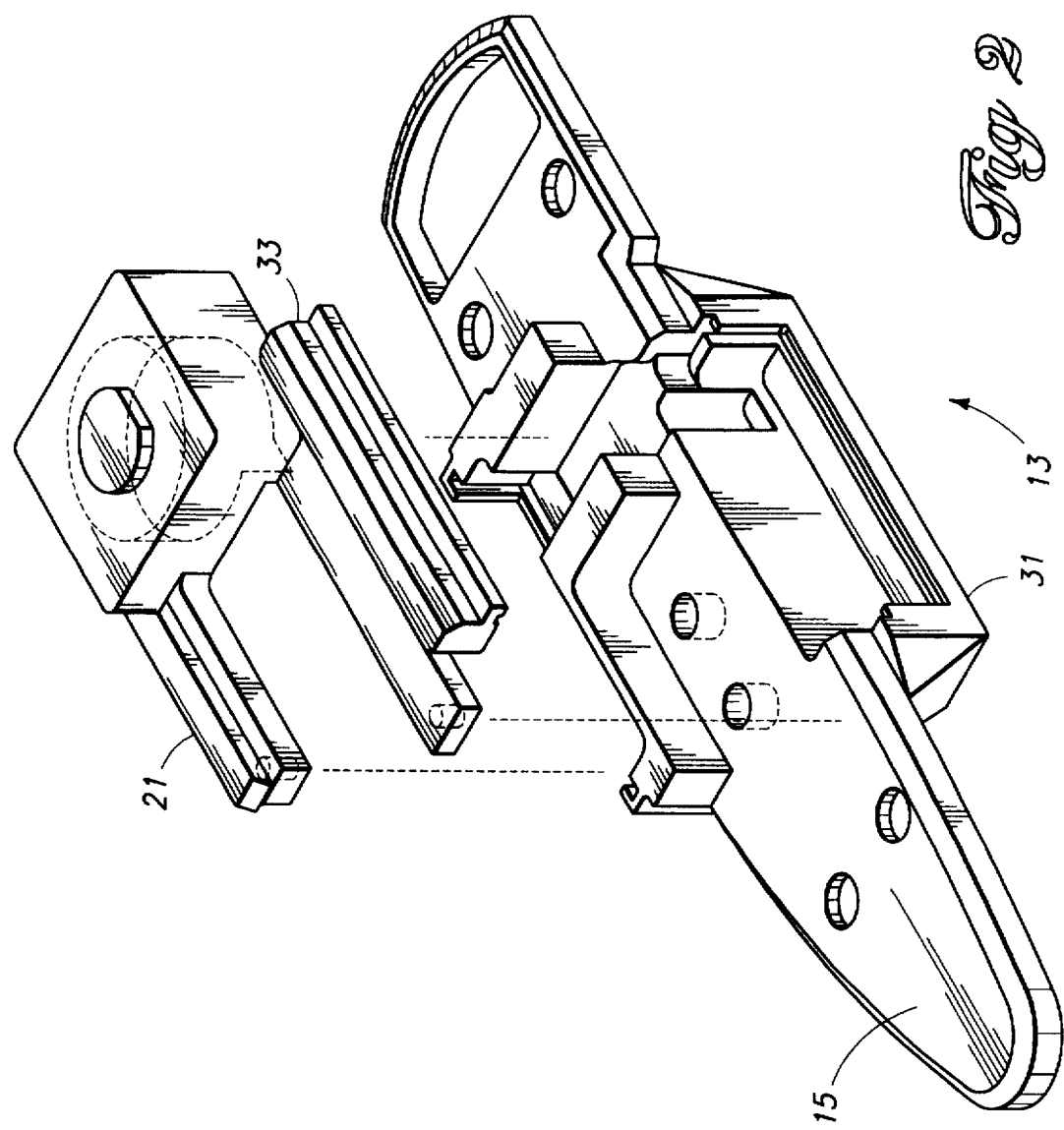
FIG. 2 is an oblique exploded view of a tip lighting system according to the invention.
Figure 3:
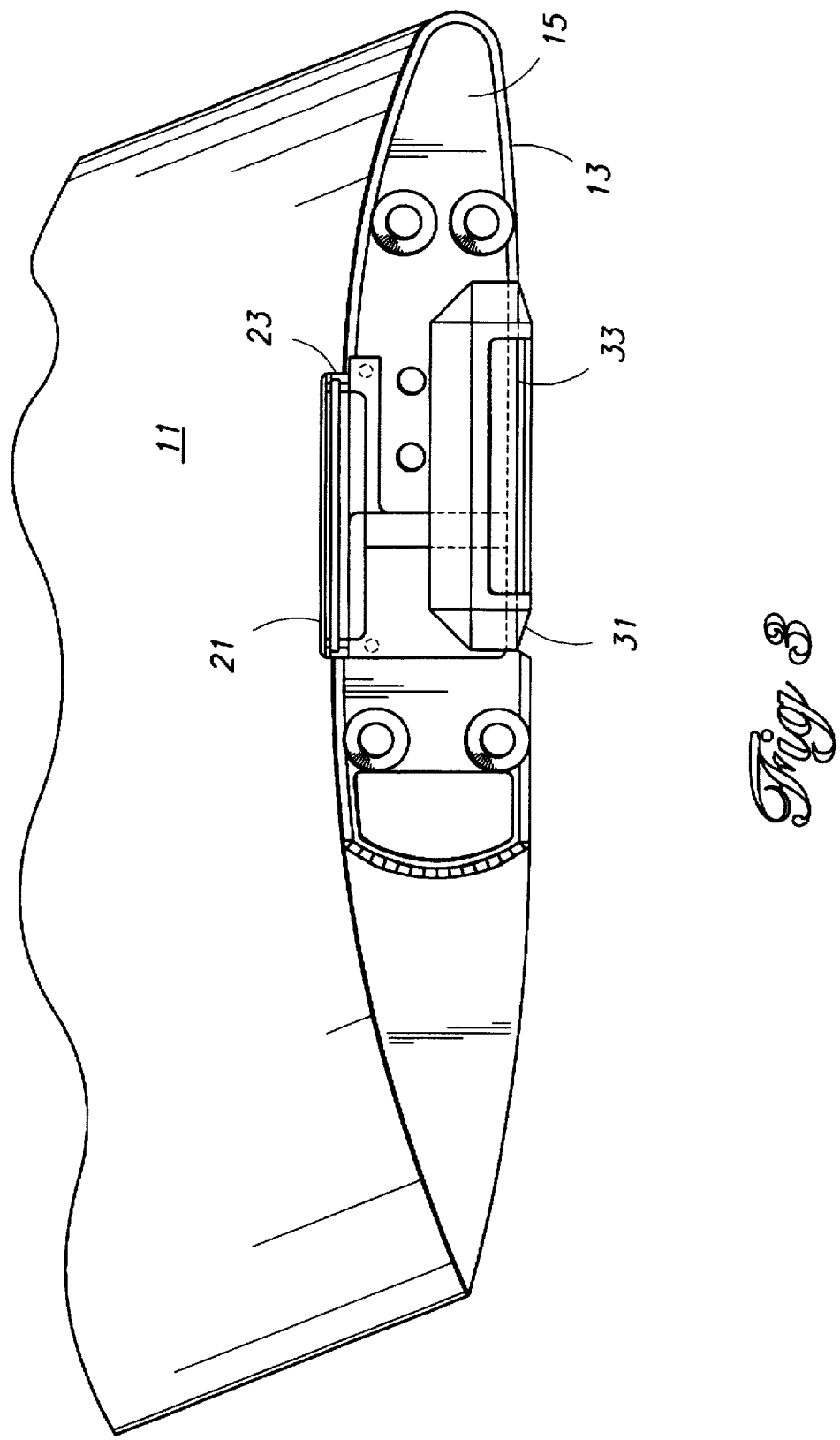
FIG. 3 shows the inventive lighting system in a side view, looking toward the rotor's swash plate.

Referring to FIGS. 1-3, the helicopter wing tip lighting system is shown mounted onto a rotor tip of a helicopter rotor blade 11. The lighting system uses a light assembly 13, which is mounted as an end cap onto the rotor tip.

The end cap consists of the generally flat piece of metal 15 which mounts to the blade 11. The end cap 15 forms an end to the airfoil of the blade and is removable in order to replace balancing weights (not shown). In the case of tip lighting systems, the end cap 15 forms a basis for the light assembly 13.

A primary light housing 21 extends upward from the end cap 15 and fits into a notched out section of the rotor blade 11. A primary lamp assembly 23 is mounted within the housing 21. The primary light housing 21 can be illuminated, and in the preferred embodiment, is visible across a substantial vertical arc extending outside of the aircraft. The primary light housing 21 cannot be seen from within the cockpit of the aircraft, since the blade 11 obstructs visibility of the primary light housing 21. During portions of a flight during which the aircraft is clear of obstacles, this is convenient, since light from the rotor blade tips can interfere with vision from the cockpit. Particularly in the case of night vision goggles (NVG) equipment, such light could also interfere with the operation of the NVG equipment if visible from the cockpit.

A secondary light housing 31 extends from the endcap 15 in a downward direction. In the preferred embodiment the secondary light housing 31 extends outward from the wing tip defined by the end cap 15, so that there is no need to further conform the rotor blade 11 to the additional light assembly. By having the secondary light housing 31 extend outward as well as downward, a rotor blade 11 which is designed for accepting light assemblies having a single light housing such as the primary light housing 21 could also accept the inventive light assembly 13. This is important because it is desirable to have a single blade design for aircraft with the inventive lighting system and for aircraft which use a prior art lighting system.

The secondary light housing 31 accepts a secondary lamp assembly 33 which is mounted within the housing 31. In its downward extension, the secondary light housing 31 is visible from within the cockpit of the aircraft. Light transmitted in the direction of the cockpit is limited to a narrow vertical arc, since it can be safely assumed that the aircraft's crew is positioned within a predefined vertical range.

In the preferred embodiment, the secondary lamp assembly 33 uses infrared side emitter light emitting diodes, which are visible when using ambient night vision (ANVIS) equipment such as night vision goggles (NVG) or forward looking infrared (FLIR) equipment 39 (FIG. 1). The secondary lamp assembly 33 has a suppressed light output so that the ANVIS equipment is not overwhelmed by the illumination of the secondary lamp assembly 33. This reduces a "blooming" effect which could result from the secondary light housing 31 and lamp assembly 33 tracing an arc across the field of view of the ANVIS equipment.

It is also possible to provide any other convenient lighting system for the secondary lamp assembly 33, such as standard candescent lamps of low light intensity. In the preferred embodiment, the primary lamp assembly 23 uses four incandescent light bulbs and the secondary lamp assembly 33 uses two infrared emitters. In the preferred embodiment, a fifth light bulb connected to the primary lamp assembly 23 is mounted in the secondary lamp housing 31 and provides visibility of the wingtip from the cockpit position. This fifth light bulb is appropriately filtered to reduce interference with ANVIS equipment or other infrared sensing equipment.

In one preferred embodiment of the invention, the secondary lighting system is also visible from outside of an arc drawn by the rotary wing tips. This visibility would be across a larger vertical arc then the visibility than the light facing the cockpit. This visibility from outside of the arc drawn by the rotor tip facilitates formation flight by permitting wingman observation of the rotor tips when using NVG equipment. It is possible to limit the vertical arc of light visibility so that a ground observer, even using NVG equipment, would have a difficult time locating the aircraft by use of the light emanating from the secondary light housing 31.

Figure 4:
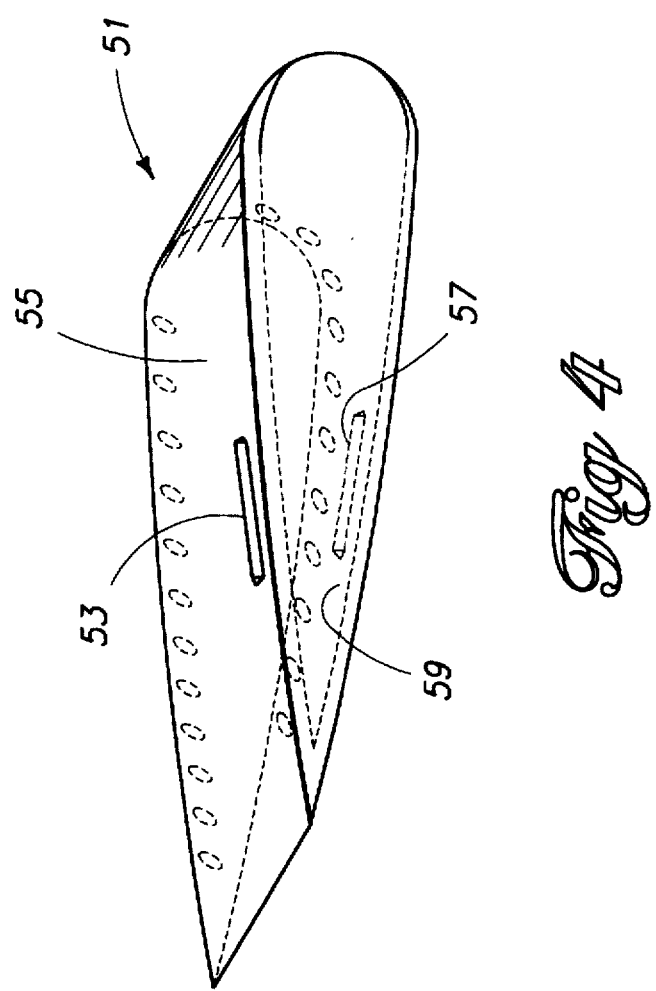
FIG. 4 shows a helicopter rotor tip of a different design, with the inventive tip lighting system.

FIG. 4 shows an alternate configuration for the invention. A rotary wing tip 51 is provided with a primary light housing 53 which is fixed to a top surface 55 of an airfoil section forming the wing tip 51. A lower light housing 57 is fixed to a bottom surface 59 of the wing tip 51. An electronic switching unit 71 is mounted inside the wing tip 51 and provides current to both the primary light housing 53 and the lower light housing 57. Suppressed output lighting is provided through the lower light housing 57, which is in a line of sight from the aircraft cockpit. In the preferred embodiment, the lower light housing 57 also contains lamps which are illuminated as a part of the primary lighting system, and the primary light housing 53 contains a suppressed output light source.

Figure 5:
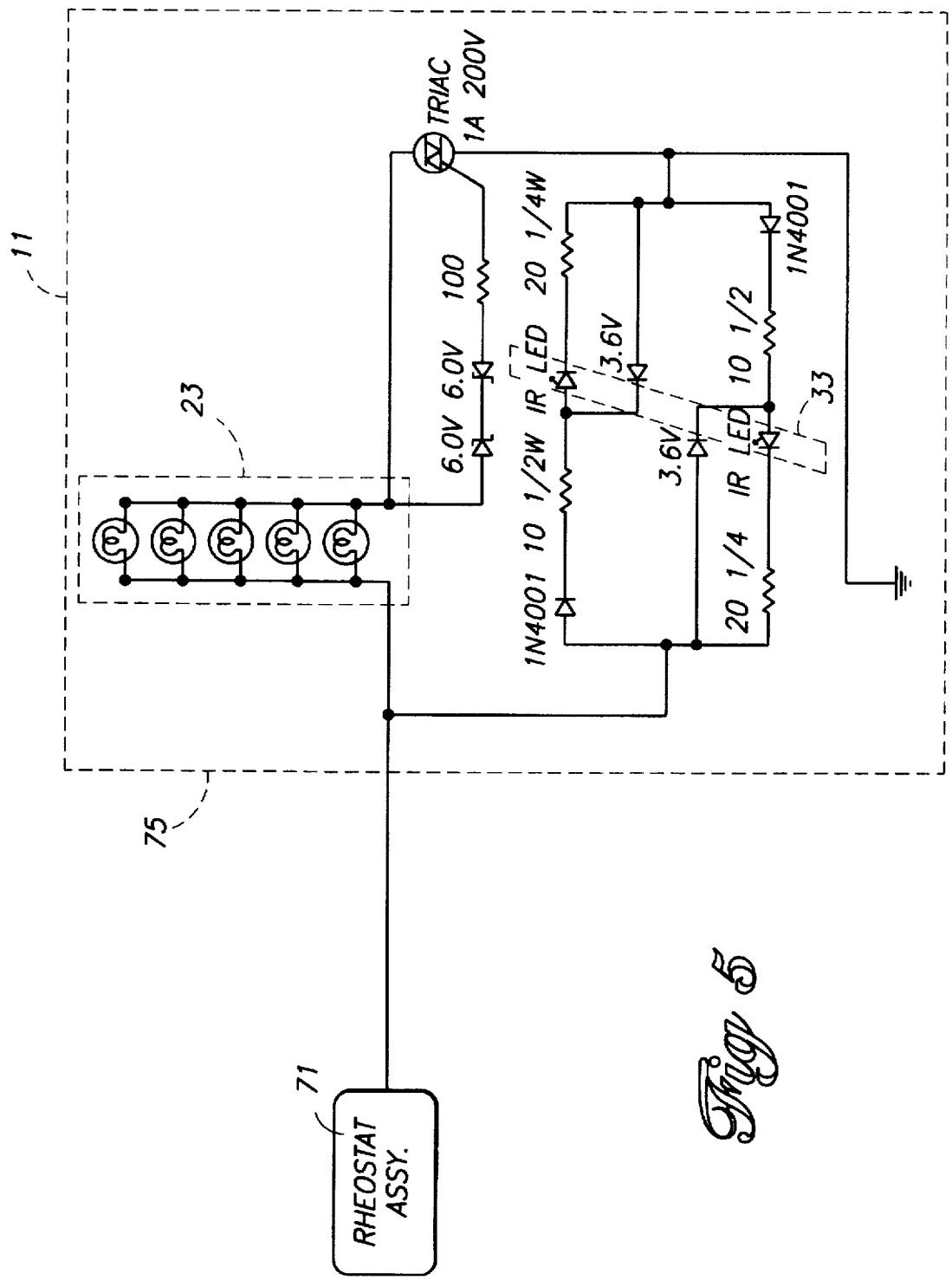
FIG. 5 shows an electrical schematic of a preferred embodiment of the invention.

FIG. 5 shows a preferred electrical configuration for the invention. A rheostat assembly 71 provides electrical current of a potential up to a driving voltage for the aircraft lighting system. In the preferred embodiment, the lights are powered by a 110 volt AC power supply, and current is controlled in its output potential by the rheostat assembly 71. Other specifications for the power supply may be used. The rheostat assembly 71 may be a simple rheostat or may be any convenient power supply for varying current and/or voltage to the lighting. The rheostat assembly 71 may include fixed value resistors which are switched in order to control output. In the present invention, it is desired to provide an incremental step, whereby potential across the lighting system beyond a predetermined voltage is not accidently exceeded. The predetermined voltage is used as a threshold for illuminating the lights in the primary lighting assembly and therefore should only be exceeded intentionally.

A control module 75 receives the output of the rheostat assembly 71 and directs power to the primary lamp assembly 23 and the secondary lamp assembly 33. The current is converted to lower potentials compatible with operating potentials of 0.75–7.0 volts. The secondary lamp assembly 33 preferably operates at a potential of 0.75–2.0 v DC and the output of the control module 75 provides current to the secondary lamp assembly 33 in that range. In addition, the control module 75 provides the secondary lamp assembly 33 with current limiting devices (resistors), if these are not provided in the secondary lamp assembly 33. The primary lamp assembly 23 can be provided with AC power, but it is anticipated that power to the primary lamp assembly 23 will be DC. If the potential from the rheostat output is below a predetermined threshold, power is restricted to the secondary lamp assembly 33. If potential from the rheostat output is above the predetermined threshold, power is provided to the primary lamp assembly 23. When power is supplied to the primary lamp assembly, power is also provided to the secondary lamp assembly 33, but with potential reduced to remain within design limits of the emitters in the secondary lamp assembly 33. In the preferred embodiment, the control module 75 is a voltage controlled switch.

In the preferred embodiment, power from the rheostat assembly 71 between 5.8 and 7.0 v AC will illuminate the primary lamp assembly 23, as well as the secondary lamp assembly 33. Power from 2.5 to 4.7 v AC will illuminate the secondary lamp assembly 33 without illuminating the primary lamp assembly 23. The preferred embodiment of the rheostat assembly 71 provides this power in five increments of potential; 2.5 v AC, 3.5 v AC, 4.7 v AC, 5.8 v AC, and 7.0 v AC.

This system permits operation of the tip lighting system with a single power conductor and a single ground conductor going to each rotor tip. The ground conductor is typically the ground potential of the aircraft, although it is also possible to establish the ground connection at a potential which is different from the ground potential of the aircraft, especially in cases where the rotor is conveniently electrically isolated from the rest of the airframe.

Figure 6:
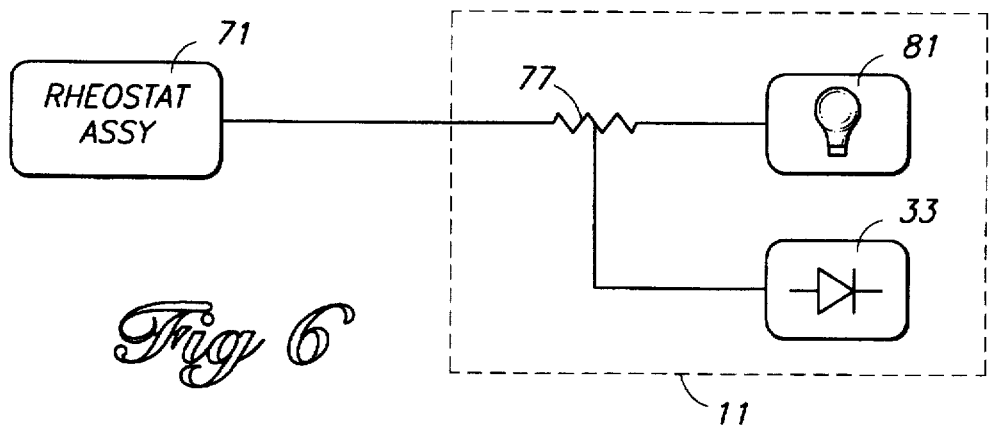
FIG. 6 shows an electrical schematic of an alternate embodiment of the invention.

FIG. 6 shows a simpler configuration of the invention, in which current from the rheostat assembly 71 is directed, via conductor 73, to the lighting assembly 13. A resistor 77 is wired in series with light bulbs 81 in the primary light housing 21. The secondary lamp assembly 33 is directly connected to the output of the rheostat 71, so that the lighting assembly 13 contains two parallel circuits. The secondary lamp assembly 33 may be connected through the resistor 77, but will emit at reduced potential and therefore will emit when the light bulbs 81 do not emit substantial light. The two parallel circuits are the primary lamp assembly 23 and resistor 71 of the primary lighting system, which are wired in parallel with the secondary lamp assembly 33 of the secondary lighting system.

Incandescent light bulbs function as thermistors; that is, as current increases sufficiently for lights to illuminate, resistance increases. Therefore, a resistor connected in series with a light bulb will cause the light bulb to remain unilluminated, and allow the voltage across the filament of the light bulb to drop. This is a result of the resistor 77 having a more or less constant resistance, while the light bulb 81 increases its resistance as it illuminates. The resistance of resistor 77 is chosen so that potential across the light bulb 81 when full power is applied by the rheostat 71 is relatively close to that of the output of the rheostat 71.

It is possible to select the size of lamps in both the primary and secondary light housings 21, 31 so that at full illumination, all lamps operate in a manner which is compatible with ANVIS. In doing so, partial illumination of all lamps can be achieved where the lamps are visible with AHVIS equipment, but afford low visibility without ANVIS equipment. In that manner, the lamps may be directly connected to the rheostat assembly 71, thereby further simplifying the configuration. In such a simplified configuration, power from the rheostat assembly 71 at low potential levels will cause the lamps to be visible primarily with ANVIS equipment, while power from the rheostat assembly 71 at higher potential levels will be visible with or without ANVIS equipment. In the case of incandescent lamps, infrared output at low driving potentials is often nearly the output of the same lamp at high driving potentials. Thus the lamps in the primary and secondary light housings 21, 31 can be operated at different ranges and still provide a similar level of lighting which is visible through ANVIS equipment.

Figure 7:
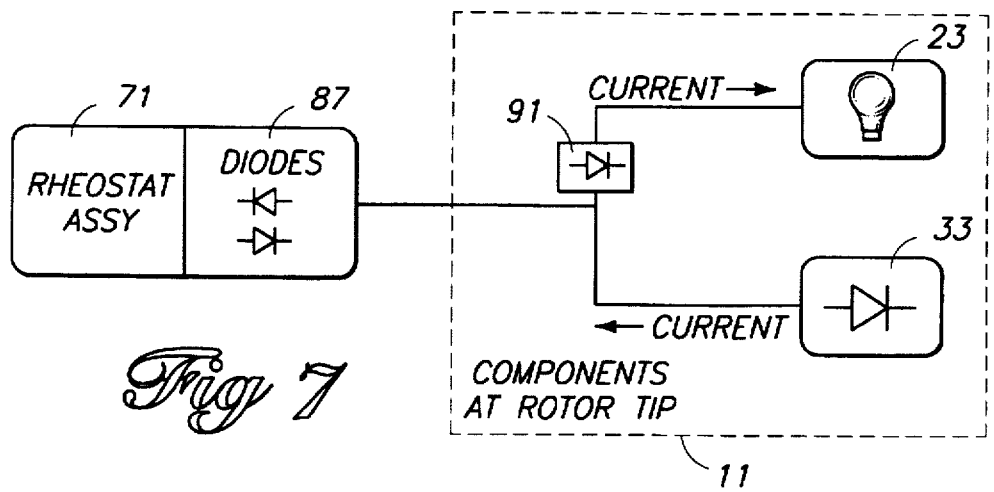
FIG. 7 shows an electrical schematic of another alternate embodiment of the invention.

FIG. 7 shows an alternate embodiment of the lighting system, in which reverse polarity, as represented by rectifier module 87, is used to control the operation of the primary lighting system. The primary lamp assembly 23 is connected in series with a diode 91. If current through the conductor 73 is provided in a forward biased condition, the primary lamp assembly 23 is illuminated, but would not be illuminated in the reverse polarity condition. The secondary lamp assembly 33 would be protected from current excesses when the primary lamp assembly 23 is illuminated. This allows the intensity of illumination to be increased or decreased, while separately controlling whether the primary lighting system lamp 23 is illuminated.

Figure 8:
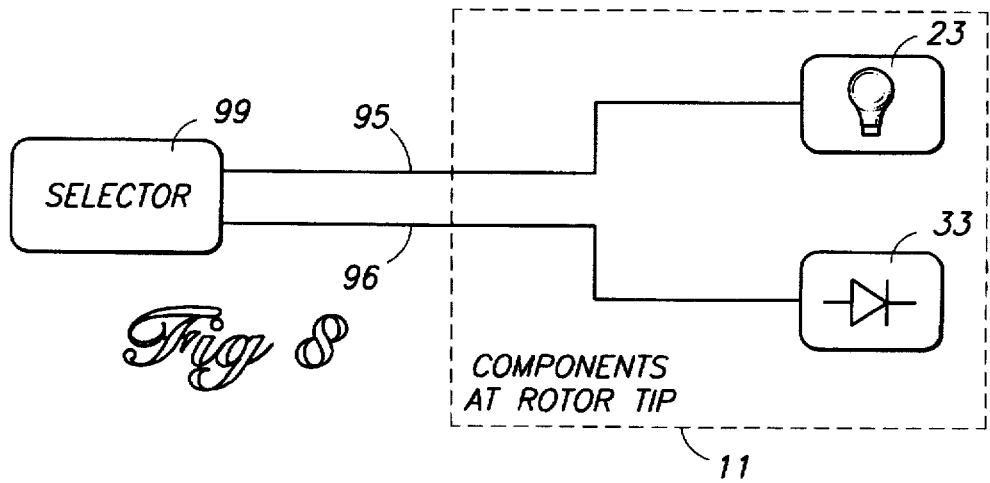
FIG. 8 shows an electrical schematic of another alternate embodiment of the invention.

FIG. 8 shows a configuration in which multiple conductors 95, 96 are used to separately control the primary and secondary lamp assemblies 23, 33. A selector 99 is used to selectively activate the primary lamp assembly 23 and may also selectively activate the secondary lamp assembly 33 according to design choice.

In the preferred embodiment, multiple light bulbs (not separately shown) are used for both the primary and secondary lamp assemblies 23, 33. The light bulbs in the primary lamp assembly 23 consist of four incandescent bulbs with rated operating potentials of 2.4–7.0 volts each. The secondary lamp assembly 83 uses two side emitting infrared light emitting diodes, which are a type of light emitting diode. The side emitting diodes have an open circuit characteristic below 0.75 v and conduct between 20 and 40 ma, when a potential of 0.75–2.0 v is applied across the diodes.

This configuration is well suited for the use of the control module 75, which receives the output of the rheostat assembly 71. The control module 75 can either switch off the secondary lamp assembly 33 or provide the secondary lamp assembly 33 with current at a potential which is within the operating range of the secondary lamp assembly. This can be accomplish by any convenient method, such as by a potential divider circuit.

As mentioned, the primary lighting system includes at least one light bulb in the secondary light housing 31, so that, when the primary lighting system is activated, rotor tip lighting can be seen by the crew without the use of NVG equipment. Light from this light bulb is filtered so as not to overpower the ANVIS equipment.

While the invention has been described in connection with rotor craft, the invention can also be used in connection with fixed wing aircraft. It is possible to position the secondary lighting system in any convenient manner which would provide visibility of the secondary lighting system to the aircraft's crew. While the downwardly-facing configuration described in the preferred embodiment is most advantageous for rotary wing aircraft, it is also possible to use different configurations, in different aircraft and different vehicles, provided that the secondary lighting system is visible to the cognizant crew members.

What is claimed is:

1. A tip lighting system comprising:
   a) a mounting support;
   b) a light housing for providing tip lighting, the light housing positioned within a visual line of sight of a cockpit position of the aircraft;
   c) a suppressed light generator within the light housing, said suppressed light generator limited in its light output for compatibility with ambient night vision (ANVIS) equipment; and
   d) a circuit to supply power to the suppressed light generator and further providing power to a primary light source such that current provided in a first sense illuminates a primary light source, and current provided in a second sense illuminates the suppressed light generator without illuminating the primary light source.

2. The tip lighting system of claim 1, further comprising:
   a) a primary light housing for providing tip lighting and including a primary light source;
   b) a circuit controlling current to the primary light source, wherein current provided in a first sense is provided at a potential sufficient to illuminate the primary light source through its series connection with said circuit controlling current, and current provided in the second sense is provided at potentials which will not illuminate the primary light source, but which will cause the suppressed light generator to illuminate.

3. The tip lighting system of claim 2, further comprising:
   a) said circuit to supply power controlling potential to said circuit controlling current to the primary light source;
   b) said circuit controlling current to the primary light source including a switch responsive to a threshold potential level from said circuit to supply power as said current provided in a first sense.

4. The tip lighting system of claim 2, further comprising:
   said circuit controlling current to the primary light source further including a potential limiting circuit to permit the suppressed light generator to have an operating range at potentials which are less than potentials of an operating range of the primary light source.

5. The tip lighting system of claim 2, further comprising:
   said circuit controlling current to the primary light source including a diode so that current in one bias direction is conducted to the primary light source as said current provided in a first sense and reverse biased current is inhibited to the primary light source.

6. The tip lighting system of claim 1, further comprising:
   a) a primary light housing for providing tip lighting and including a primary light source consisting of at least one incandescent lamp;
   b) the suppressed light generator including at least one infrared light emitting diode.

7. The tip lighting system of claim 1, wherein light from the suppressed light generator is limited in its directional projection to a range which allows cockpit visibility of the suppressed light generator.

8. The tip lighting system of claim 1, further comprising:
   the suppressed light generator providing illumination which is visible when viewed with ambient night vision (ANVIS) equipment, but which is sufficiently suppressed to permit normal operation of said ANVIS equipment and infrared sensing equipment despite the illumination of the suppressed light generator.

9. A tip lighting system comprising:
   a) a mounting support configured for attachment at a far extension of a vehicle;
   b) a primary light housing for providing tip lighting and including an incandescent light source;
   c) a secondary light housing for providing tip lighting, the secondary housing positioned within a visual line of sight of a cockpit position of the aircraft;
   d) a suppressed light generator within the secondary light housing, said suppressed light generator limited in its light output for compatibility with ambient night vision (ANVIS) equipment; and
   e) a circuit to supply power to the suppressed light generator and further providing power to a primary light source such that current provided in a first sense illuminates the primary light source, and current provided in a second sense illuminates the suppressed light generator without illuminating the primary light source.

10. The tip lighting system of claim 9, wherein the far extension of the vehicle is rotor tip on a rotary wing aircraft.

11. A tip lighting system for an aircraft of a type in which at least one electrical power conductor and at least one ground conductor provide power to lamps in the wingtip, an improvement comprising:
    a) a secondary lighting assembly and positioned within a visual line of sight of a cockpit position of the aircraft;
    b) a suppressed light generator within the secondary light housing, said suppressed light generator limited in its light output for compatibility with ambient night vision (ANVIS) equipment; and
    c) a circuit to supply power to the suppressed light generator and further providing power to a primary light source such that current provided in a first sense illuminates the primary light source, and current provided in a second sense illuminates the suppressed light generator without illuminating the primary light source.

12. A tip lighting system for an aircraft wherein:
    a) at a first illumination level the tip lighting seen from within a cockpit position of the aircraft by use of light augmentation devices, and seen from nearby aircraft by the use of light augmentation devices but visibility without light augmentation devices is substantially limited as compared with conventional navigation lighting;
    b) at a second illumination level the tip lighting visible from within a cockpit position and from nearby aircraft without the use of light augmentation devices; and
    c) at the first illumination level and the second illumination level, the tip lighting system provides light output sufficiently suppressed for compatibility with ambient night vision (ANVIS) equipment.

13. The tip lighting system of claim 12, further comprising:

a) a suppressed light source for providing suppressed illumination in said first illumination level;

b) a primary light source for providing visible light in said second illumination level;

c) a circuit controlling current to the primary light source, wherein current provided in a first sense is provided at a potential sufficient to illuminate the primary light source through its series connection with said circuit controlling current, and current provided in the second sense is provided at potentials which will not illuminate the primary light source, but which will cause the suppressed light generator to illuminate.

14. The tip lighting system of claim 13, further comprising:

said circuit controlling current to the primary light source including a switch responsive to a threshold potential level from a power supply.

15. The tip lighting system of claim 13, further comprising:

said circuit controlling current to the primary light source further including a potential limiting circuit to permit the suppressed light generator to have an operating range at potentials which are less than potentials of an operating range of the primary light source.

16. The tip lighting system of claim 13, further comprising:

said circuit controlling current to the primary light source including a diode so that current in one bias direction is conducted to the primary light source as said current provided in a first sense and reverse biased current is inhibited to the primary light source.

17. The tip lighting system of claim 12, further comprising:

a) a primary light housing for providing tip lighting and including a primary light source consisting of at least one incandescent lamp, said incandescent lamp illuminating at said first illumination level;

b) the suppressed light generator including at least one infrared light emitting diode.

18. The tip lighting system of claim 12, wherein light from the suppressed light generator is limited in its directional projection to a range which allows cockpit visibility of the suppressed light generator.

19. The tip lighting system of claim 12, further comprising:

the suppressed light generator providing illumination which is visible when viewed with ambient night vision (ANVIS) equipment, but which is sufficiently suppressed to permit normal operation of said ANVIS equipment and infrared sensing equipment despite the illumination of the suppressed light generator.

* * * * *